United States Patent
Khirallah et al.

(10) Patent No.: US 11,800,377 B2
(45) Date of Patent: Oct. 24, 2023

(54) COMMUNICATION SYSTEM (71) Applicant: NEC CORPORATION, Tokyo (JP)

(72) Inventors: Chadi Khirallah, Epsom (GB); Yassin Aden Awad, Uxbridge (GB); Neeraj Gupta, Sutton (GB); Robert Arnott, London (GB)

(73) Assignee: NEC CORPORATION, Tokyo (JP)

(*) Notice: Subject to any disclaimer, the term of this patent is extended or adjusted under 35 U.S.C. 154(b) by 20 days.

(21) Appl. No.: 17/366,576

(22) Filed: Jul. 2, 2021

(65) Prior Publication Data
US 2021/0337399 A1 Oct. 28, 2021

Related U.S. Application Data (63) Continuation of application No. 16/324,761, filed as application No. PCT/JP2017/029061 on Aug. 10, 2017, now abandoned.

(30) Foreign Application Priority Data

Aug. 12, 2016 (GB) .................................... 1613902

(51) Int. Cl.
*H04L 5/14* (2006.01)
*H04W 16/28* (2009.01)
*H04W 24/08* (2009.01)
*H04B 7/06* (2006.01)
*H04B 7/024* (2017.01)

(52) U.S. Cl.
CPC .......... *H04W 16/28* (2013.01); *H04B 7/0695* (2013.01); *H04W 24/08* (2013.01); *H04B 7/024* (2013.01); *H04B 7/0621* (2013.01)

(58) Field of Classification Search
None
See application file for complete search history.

(56) References Cited

U.S. PATENT DOCUMENTS

| | | | |
|---|---|---|---|
| 2008/0318606 A1 | 12/2008 | Tsutsui et al. | |
| 2010/0075705 A1* | 3/2010 | van Rensburg | H04B 7/024 |
| | | | 455/67.11 |
| 2013/0155847 A1 | 6/2013 | Li et al. | |

(Continued)

FOREIGN PATENT DOCUMENTS

| | | |
|---|---|---|
| CN | 103299668 A | 9/2013 |
| CN | 205029667 U | 2/2016 |

(Continued)

OTHER PUBLICATIONS

Chinese Office Action for CN Application No. 201780062915.7 dated Dec. 28, 2020 with English Translation.

(Continued)

*Primary Examiner* — Willie J Daniel, Jr.
(74) *Attorney, Agent, or Firm* — Sughrue Mion, PLLC (57) ABSTRACT

A communication system is disclosed in which a base station serves a communication area, wherein the communication area is formed by a plurality of directional beams each covering a respective portion of the communication area and each having a different respective beam identifier. The base station communicates control information, for a communication device (UE), using at least one directional beam associated with that communication device (e.g. a UE-specific operational beam set).

8 Claims, 6 Drawing Sheets

(56) References Cited

U.S. PATENT DOCUMENTS

| | | | |
|---|---|---|---|
| 2013/0286960 A1 | 10/2013 | Li et al. | |
| 2014/0079100 A1 | 3/2014 | Kim et al. | |
| 2014/0120926 A1 | 5/2014 | Shin et al. | |
| 2015/0236774 A1 | 8/2015 | Son et al. | |
| 2016/0119958 A1 | 4/2016 | Tan et al. | |
| 2016/0157267 A1* | 6/2016 | Frenne .............. | H04W 74/0833 370/329 |
| 2016/0183233 A1 | 6/2016 | Park | |
| 2016/0197659 A1 | 7/2016 | Yu et al. | |

FOREIGN PATENT DOCUMENTS

| | | | |
|---|---|---|---|
| CN | 105580448 | A | 5/2016 |
| JP | 2014524705 | A | 9/2014 |
| JP | 2014-532320 | A | 12/2014 |
| KR | 10-1573342 | B1 | 12/2015 |
| WO | 2015045658 | A1 | 4/2015 |
| WO | 2015166840 | A1 | 11/2015 |
| WO | 2016013351 | A1 | 1/2016 |
| WO | 2016/203312 | A1 | 12/2016 |

OTHER PUBLICATIONS

"A Delivery by the NGMN Alliance NGMN 5G White Paper", V1.0 by the Next Generation Mobile Networks (NGMN) Alliance, Feb. 17, 2015, 125 pages.

"3rd Generation Partnership Project; Technical Specification Group Services and System Aspects; Study on Architecture for Next Generation System (Release 14)", 3GPP TR 23.799 V0.7.0, Aug. 2016, 322 pages.

Search Report for Corresponding GB 1613902.4, dated Jan. 11, 2017.

International Search Report for PCT/JP2017/029061, dated Nov. 24, 2017.

Notice of Reasons for Refusal dated Feb. 18, 2020 from the Japanese Patent Office in application No. 2019-507361.

Mitsubishi Electric,"Beam control operation for common channels/signals in NR", Sweden, Aug. 22-26, 2016, 3GPP TSG-RAN WG1 #86, R1-166228, pp. 1-10.

EP Office Communication for EP Application No. 17757903.4, dated Feb. 22, 2023.

Jasper Meynard Arana et al: "Random-Access Technique for Self-Organization of 5G Millimeter-Wave Cellular Communications", Hindawi, Mobile Information Systems, vol. 2016, Jan. 1, 2016, pp. 1-11, XP055506964, Netherlands, ISSN: 1574-017X, DOI: 10.1155/2016/5261089.

Japanese Office Action for JP Application No. 2021-186953 dated Feb. 7, 2023 with English Translation.

* cited by examiner

COMMUNICATION SYSTEM

CROSS-REFERENCE TO RELATED APPLICATIONS

This is a continuation application of U.S. application Ser. No. 16/324,761, filed Feb. 11, 2019, which is a National Stage of International Application No. PCT/JP2017/029061, filed Aug. 10, 2017, claiming priority based on British Patent Application No. 1613902.4, filed Aug. 12, 2016, the contents of all of which are incorporated herein by reference in their entirety.

TECHNICAL FIELD

The present invention relates to a communication system. The invention has particular but not exclusive relevance to wireless communication systems and devices thereof operating according to the 3rd Generation Partnership Project (3GPP) standards or equivalents or derivatives thereof. The invention has particular although not exclusive relevance to mobility in the so-called 'Next Generation' systems using beamforming.

BACKGROUND ART

The latest developments of the 3GPP standards are referred to as the Long Term Evolution (LTE) of Evolved Packet Core (EPC) network and Evolved UMTS Terrestrial Radio Access Network (E-UTRAN), also commonly referred as '4G'. In addition, the term '5G' and 'new radio' (NR) refer to an evolving communication technology that is expected to support a variety of applications and services. Various details of 5G networks are described in, for example, the 'NGMN 5G White Paper' V 1.0 by the Next Generation Mobile Networks (NGMN) Alliance, which document is available from https://www.ngmn.org/5g-white-paper.html. 3GPP intends to support 5G by way of the so-called 3GPP Next Generation (NextGen) radio access network (RAN) and the 3GPP NextGen core network.

Under the 3GPP standards, a NodeB (or an eNB in LTE, gNB in 5G) is the base station via which communication devices (user equipment or 'UE') connect to a core network and communicate to other communication devices or remote servers. For simplicity, the present application will use the term base station to refer to any such base stations and use the term mobile device or UE to refer to any such communication device. The core network (i.e. the EPC in case of LTE) hosts functionality for subscriber management, mobility management, charging, security, and call/session management (amongst others), and provides connection for communication devices to external networks, such as the Internet.

Communication devices might be, for example, mobile communication devices such as mobile telephones, smartphones, user equipment, personal digital assistants, laptop/tablet computers, web browsers, e-book readers and/or the like. Such mobile (or even generally stationary) devices are typically operated by a user, although it is also possible to connect so-called 'Internet of Things' (IoT) devices and similar machinetype communication (MTC) devices to the network. For simplicity, the present application refers to mobile devices (or UEs) in the description but it will be appreciated that the technology described can be implemented on any communication devices (mobile and/or generally stationary) that can connect to a communications network for sending/receiving data, regardless of whether such communication devices are controlled by human input or software instructions stored in memory.

3GPP technical report (TR) 23.799 V0.7.0 describes a possible architecture and general procedures for NextGen (5G) systems planned for Release 14 of the 3GPP standards. 3GPP also studied the potential use of frequency bands up to 100 GHz for new (5G) radio access networks. Directional beamforming and massive antenna technologies may also be used in order to overcome the severe channel attenuation characteristics associated with certain high frequency bands (e.g. mmWave bands). The term 'massive antenna' refers to an antenna having a high number of antenna elements (e.g. 100 or more) arranged in an army. Effectively, such a massive antenna may be used to communicate with several users at the same time, thus facilitating multi-user MIMO (multiple-input and multiple-output) transmissions. A base station (also referred to as a transmission and reception point (TRP) in this case) may be configured to form respective beams for communicating with a plurality of UEs substantially concurrently and using associated directional beams.

3GPP has agreed on a number of intra-5G mobility related requirements. Specifically, 3GPP intends to provide one or more TRPs per new radio (NR) base station (i.e. 5G base station, or gNB). As baseline, each NR is expected to support a state with network controlled mobility handling and a state with UE controlled mobility. The measurement configuration associated with typical inter-gNB network controlled mobility is kept minimised. Therefore, each UE is required to perform fewer (and possibly less detailed) measurements for mobility purposes (e.g. avoid the need to provide detailed 'cell' level information). However, more detailed information may be requested in some cases. 3GPP also intends to minimise context move (between base stations) as a consequence of UE based mobility.

Network controlled mobility may be either RRC-driven at cell level (i.e. using appropriate radio resource control (RRC) signalling between the gNB and the UE to control UE mobility) or may be provided with zero/minimum RRC involvement (e.g. at MAC/PHY layer).

SUMMARY OF INVENTION

Technical Problem

However, especially in high frequency bands, an obstruction (e.g. by an obstacle) of the direct, line-of-sight (LOS) path between a transmitter and receiver and/or mobility of the UE may result in a degradation of the radio link quality for that UE. Moreover, some studies suggest that at mmWave frequencies the radio channel can change very rapidly and this may also result in an increase in transmission errors and/or the number of handovers for a particular UE. Therefore, UEs served via directional beams may be prone to losing connection with their base station and data loss. Moreover, existing (e.g. LTE) mobility techniques are not applicable to 5G RANs due to the technological differences and bandwidths used.

It is foreseen that the relative unreliability of high frequencies and directional beams may lead to frequent changes in the beam used by an active LIE and its 50 base station/TRP. This may result in, for example, increased session interruption (inter-beam handover), signalling overhead, and/or transmission inefficiencies (e.g. an increased need for retransmissions).

Accordingly, preferred example embodiments of the present invention aim to provide methods and apparatus which address or at least partially deal with the above issues.

Although for efficiency of understanding for those of skill in the art, the invention will be described in detail in the context of a 3GPP system (5G networks), the principles of the invention can be applied to other systems.

Solution to Problem

In one aspect, the invention provides a base station for a communication system, wherein the base station comprises: a controller and a transceiver; wherein the controller is configured to control communication in a communication area served by the base station, wherein the communication area is formed by a plurality of directional beams each covering a respective portion of the communication area served by the base station and each having a different respective beam identifier; and wherein the transceiver is configured to communicate control information, for at least one communication device, using at least one directional beam associated with the at least one communication device.

In another aspect, the invention provides a communication device for a communication system comprising a base station serving a communication area formed by a plurality of directional beams each covering a respective portion of the communication area and each having a different respective beam identifier, wherein the communication device comprises: a controller and a transceiver; wherein the transceiver is configured to receive control information, from the base station, using at least one directional beam associated with the communication device.

Aspects of the invention extend to corresponding systems, methods, and computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently of (or in combination with) any other disclosed and/or illustrated features. In particular but without limitation the features of any of the claims dependent from a particular independent claim may be introduced into that independent claim in any combination or individually.

Example embodiments of the invention will now be described, by way of example, with reference to the accompanying drawings in which:

DESCRIPTION OF EMBODIMENTS

Overview

Figure 1:
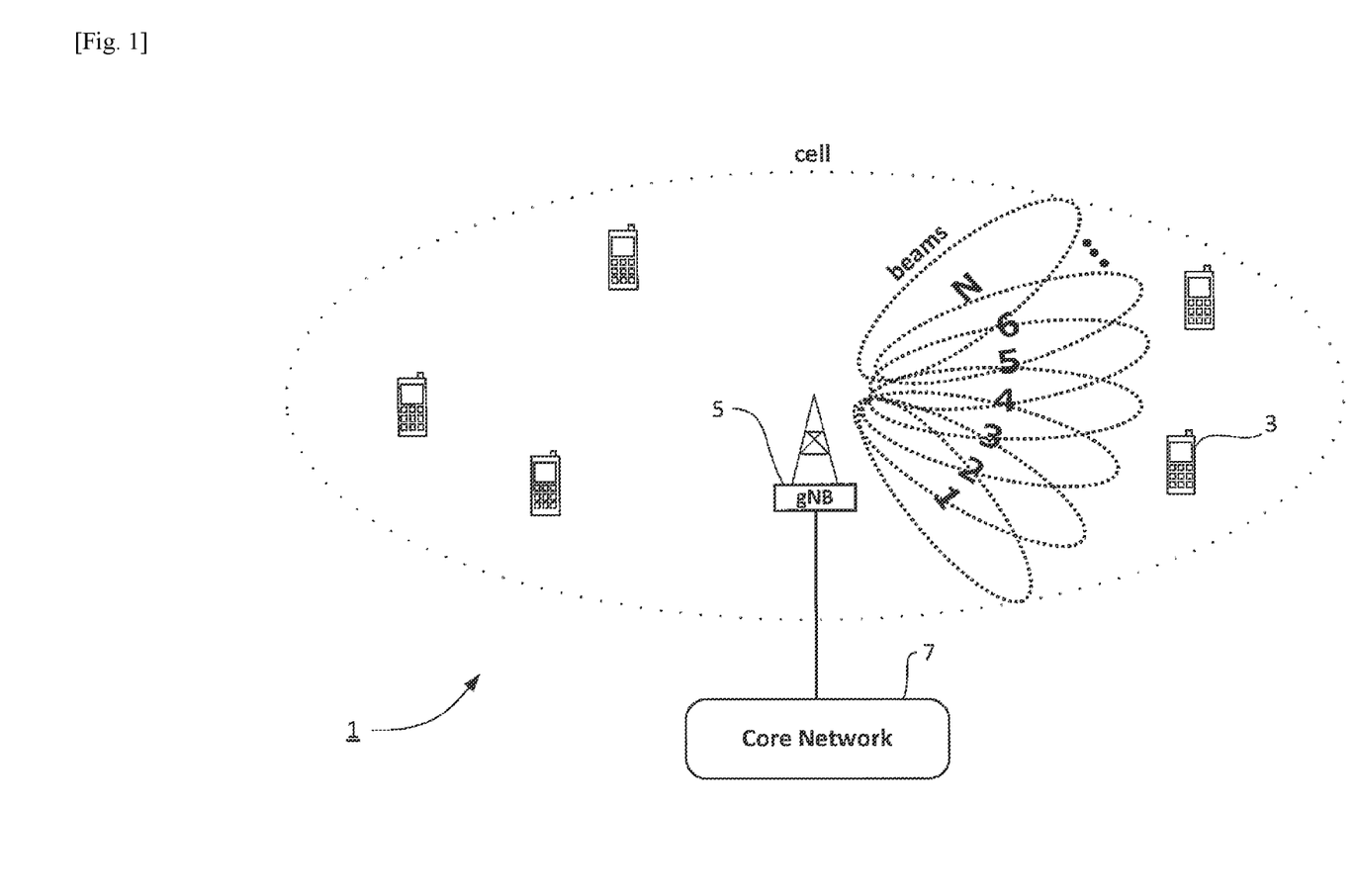
FIG. 1 illustrates schematically a cellular telecommunication system to which example embodiments of the invention may be applied.

FIG. 1 schematically illustrates a telecommunications network 1 in which user equipment 3 (mobile telephones and/or other mobile devices) can communicate with each other via base stations 5 (denoted 'gNB') using an appropriate radio access technology (RAT). It will be appreciated that in 5G systems base stations are also referred to as transmit receive points (TRPs). As those skilled in the art will appreciate, whilst five mobile device 3 and one base station 5 are shown in FIG. 1 for illustration purposes, the system, when implemented, will typically include other base stations and mobile devices.

Each base station 5 operates one or more associated cells either via a TRP located at the base station (and/or one or more remotely located TRPs). In this example, for simplicity, the base station 5 operates a single cell. The base station 5 is connected to a core network 7 (e.g. via an appropriate gateway and/or user-plane/control function) and neighbouring base stations are also connected to each other (either directly or via an appropriate base station gateway). The core network 7 may include, amongst others, a control plane manager entity and a user plane manager entity, one or more gateways (GWs) for providing a connection between the base stations 5 and other networks (such as the Internet) and/or servers hosted outside the core network.

The mobile device 3 connects to an appropriate cell (depending on its location and possibly on other factors, e.g. signal conditions, subscription data, capability, and/or the like) by establishing a radio resource control (RRC) connection with the base station 5 operating that cell. The mobile device 3 and base stations 5 (and other transmission points in the network) communicate over an appropriate air interface which depends on the RAT used. The mobile devices 3 communicate with core network nodes using so-called non-access stratum (NAS) signalling, which is relayed between the mobile device 3 and the appropriate core network node by the base station 5/TRP serving the mobile device 3.

In this example, the base station 5 operates an associated antenna array (e.g. a massive antenna) for providing a plurality of directional beams for communicating with the various mobile devices 3 in the base station's 5 cell. Each beam is arranged to span (transmit) in a different direction (in three dimension, including elevation angle). Each beam has an associated identifier (e.g. an appropriated 'Beam ID') which is unique (at least within the cell).

The beam configuration used in the cell defines the number of beams and the associated beam patterns. In this example, the total number of beams is 'N', i.e. beams #1 though #N are currently configured for the cell of the base station 5 ('N' being a positive integer, at least '1').

The base station 5 is beneficially configured to transmit in its cell (or in each cell if the base station operates multiple cells) a set of beam-specific reference signals (BRS). The mobile devices 3 may be configured to use the associated BRS for performing signal strength and channel estimate measurements for each beam. Such beam specific measurements are used (by the base station and/or the mobile device 3) for configuring an appropriate set of (one or multiple) beams for the mobile device 3, which set is referred to as the Operational Beam Set (OBS) of the mobile device 3.

The OBS may be dynamically updated. e.g. depending on signal conditions, load in the cell, a throughput and/or quality of service (QoS) required by the mobile device 3. Beneficially, when the OBS comprises multiple beams, the likelihood of the mobile device 3 suffering a radio link failure (RLF)—i.e. a loss off connection with the base station 5—is greatly reduced because in most situations there is at least one directional beam that the mobile device 3 can use and/or new beams may be added to the OBS if needed (at least temporarily).

Moreover, the OBS may be beneficially used to support intra-cell mobility for the mobile device 3. Specifically, as the mobile device 3 changes its location within the base station's 5 coverage area (cell), new beams may be added to the OBS as necessary (and beams that are no longer needed may be removed).

The mobile device 3 may be configured to perform and report more frequent signal measurements (for example, detailed Channel Status Information (CSI) measurements) for those beams that are included in the OBS of the mobile device 3 than other beams. Therefore, when an obstacle is present (e.g. temporarily) between the mobile device 3 and the base station 5 (blocking line of sight for a particular directional beam) then it is possible to detect such change in signal condition (and identify the affected beam) relatively quickly. The base station 5 can also carry out necessary adjustments in its transmissions for the mobile device 3 in order to avoid disruptions and/or radio link failure due to the obstacle. Beneficially, however, the mobile device 3 will most likely be able to continue communicating with the base station 5 using any other suitable (unaffected) beam in its OBS. If the problem affecting a particular beam in the OBS persists, the base station 5 may remove that beam from the OBS (e.g. after expiry of a predetermined timer and/or after receiving a predetermined number of reports indicating problems with that beam).

Similarly, the base station 5 may be configured to remove a beam from the OBS of the mobile device 3 (and replace it with a different beam) due to mobility of the mobile device 3.

As can be seen, therefore, the provision of an OBS (and/or associated beam specific reference signals) provides a number of benefits such as flexibility in serving the mobile devices via the base station's cell, improved tolerance for signal propagation issues (e.g. obstacles) affecting high frequency radio beams, lower risk for radio link failures due to loss of signal, faster and more efficient cell/beam acquisition by mobile devices (e.g. whilst moving within the cell or between different cells).

Mobile Device

Figure 2:
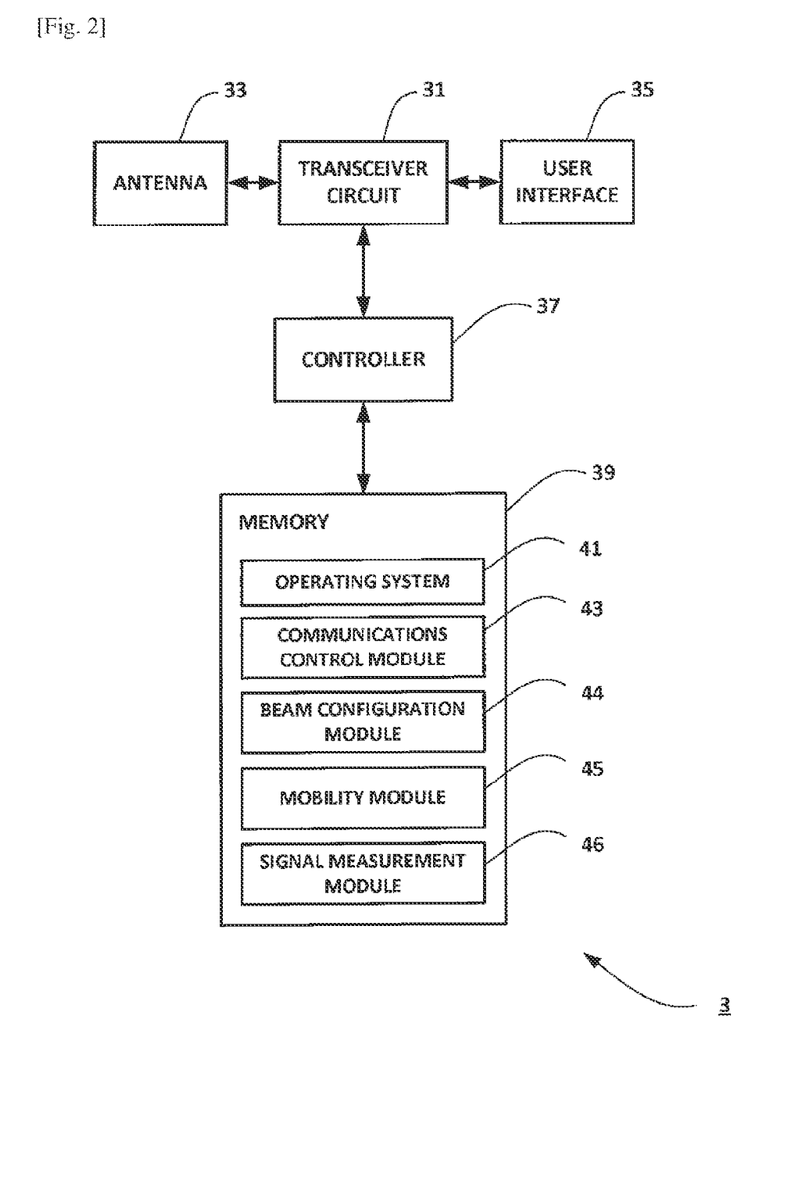
FIG. 2 is a block diagram of a mobile device forming part of the system shown in FIG. 1.

FIG. 2 is a block diagram illustrating the main components of the mobile device 3 shown in FIG. 1 (e.g. a mobile telephone or other user equipment). As shown, the mobile device 3 has a transceiver circuit 31 that is operable to transmit signals to and to receive signals from a base station 5 via one or more antenna 33. The mobile device 3 has a controller 37 to control the operation of the mobile device 3. The controller 37 is associated with a memory 39 and is coupled to the transceiver circuit 31. Although not necessarily required for its operation, the mobile device 3 might of course have all the usual functionality of a conventional mobile telephone 3 (such as a user interface 35) and this may be provided by any one or any combination of hardware, software and firmware, as appropriate. Software may be pre-installed in the memory 39 and/or may be downloaded via the telecommunications network or from a removable data storage device (RMD), for example.

The controller 37 is configured to control overall operation of the mobile device 3 by, in this example, program instructions or software instructions stored within the memory 39. As shown, these software instructions include, among other things, an operating system 41, a communications control module 43, a beam configuration module 44, a mobility module 45, and a signal measurement module 46.

The communications control module 43 is operable to control the communication between the mobile device 3 and its serving base station(s) 5 (and other communication devices connected to the base station 5, such as further mobile devices and/or core network nodes).

The beam configuration module 44 is responsible for managing the OBS (or respective OBS's) for the mobile device 3 used in the current serving cell (or cells). This includes, for example, adding and removing cells (e.g. based on information provided by the base station 5 and/or the signal measurement module 46).

The mobility module 45 is responsible for maintaining network attachment via an appropriate cell (of a base station 5) whilst the mobile device 3 is moving within the area covered by the telecommunications network 1. The mobility module 45 maintains network attachment by performing a cell/beam reselection and/or handover procedure in dependence on signal conditions and/or the like. It will be appreciated that the mobility module 45 may perform a cell/beam reselection and/or handover procedure even when the mobile device 3 remains stationary, for example, due to changes in signal conditions, network load in the current cell, and/or the like. The mobility module 45 also takes into account, for the current cell and/or potential handover candidate cells, the OBS of the mobile device 3 and/or the current beam configuration (e.g. provided by the beam configuration module 44).

The signal measurement module 46 is responsible for obtaining signal quality measurements for cells/beams in the vicinity of the mobile device 3 and to generate and transmit associated signal measurement reports to the serving base station 5. The signal quality measurements are performed over beam specific reference signals transmitted by the base station 5 based on an appropriate measurement configuration provided by the serving base station 5. The signal quality measurements may include for example, (detailed) Channel Status Information (CSI) measurements, reference signal received power (RSRP), reference signal received quality (RSRQ), received signal-to-noise ratio (SNR), and/or signal to interference plus noise ratio (SINR) measurements and associated reporting.

Base Station

Figure 3:
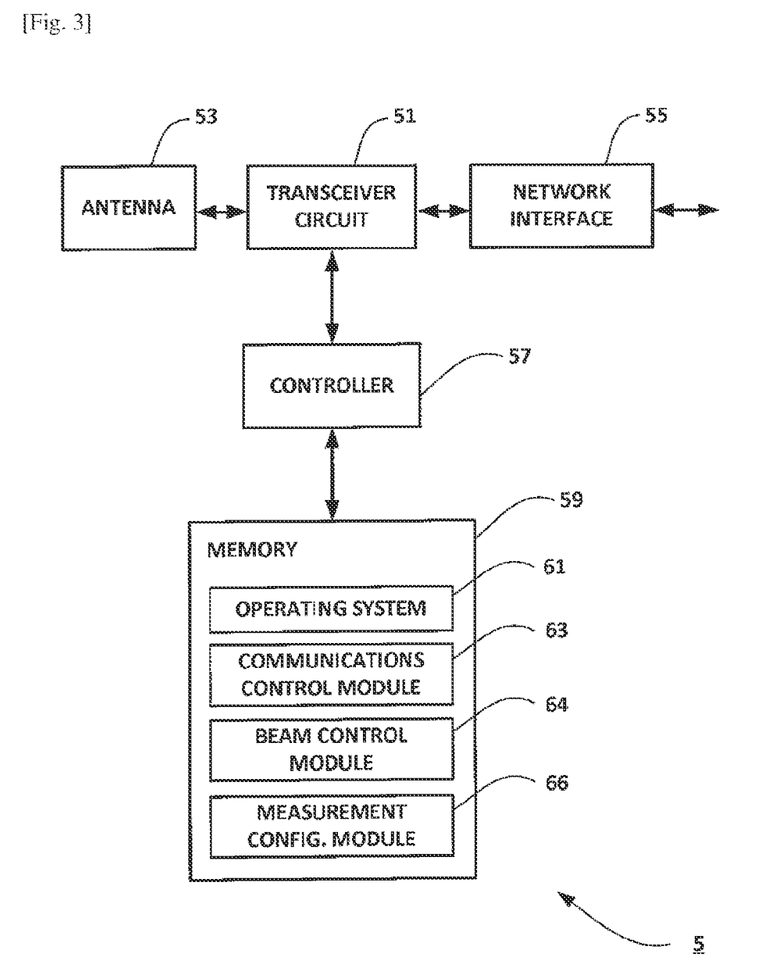
FIG. 3 is a block diagram of a base station forming part of the system shown in FIG. 1.

FIG. 3 is a block diagram illustrating the main components of a base station 5 shown in FIG. 1. As shown, the base station 5 has a transceiver circuit 51 for transmitting signals to and for receiving signals from the communication devices (such as mobile devices 3/user equipment) via one or more antenna 53 (e.g. an antenna array/massive antenna), and a network interface 55 for transmitting signals to and for receiving signals from network nodes (e.g. other base stations and/or nodes in the core network 7). The base station 5 has a controller 57 to control the operation of the base station 5. The controller 57 is associated with a memory 59. Software may be pre-installed in the memory 59 and/or may be downloaded via the telecommunications network 1 or from a removable data storage device (RMD), for example. The controller 57 is configured to control the overall operation of the base station 5 by, in this example, program instructions or software instructions stored within the memory 59. As shown, these software instructions include, among other things, an operating system 61, a communications control module 63, a beam control module 64, and a measurement configuration module 66.

The communications control module 63 is operable to control the communication between the base station 5 and mobile devices 3 (user equipment) and other network entities that are connected to the base station 5. The communications control module 63 also controls the separate flows of downlink user traffic (via associated data radio bearers) and control data to be transmitted to communication devices associated with this base station 5 including, for example, control data for core network services and/or mobility of the mobile device 3 (also including general (non-UE specific) system information and reference signals).

The beam control module 64 is responsible for managing the associated OBS for each mobile device 3 in the cell (or cells) of the base station 5. This includes, for example, adding and removing cells (e.g. based on information such as signal measurements provided by the mobile device 3, mobility of the mobile device 3, and/or other information relevant to the cell, such as load information).

The measurement configuration module 66 is responsible for configuring mobile devices 3 for performing and reporting signal quality measurements for cells and/or beams in the vicinity of the mobile devices 3 (e.g. cells/beams operated by this base station 5 and/or a neighbouring base station). The measurement configuration module 66 obtains signal quality measurements by generating and sending an appropriate measurement configuration to a particular mobile device 3 and by receiving an associated measurement report. The measurement report may be used, for example, when performing a mobility and/or beam configuration procedure involving the mobile device 3 that provided the report.

In the above description, the mobile device 3 and the base station 5 are described for ease of understanding as having a number of discrete modules (such as the communications control modules and the beam configuration/control modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

A more detailed description will now be given (with reference to FIGS. 4 to 7) of some ways in which directional beams/OBS may be used for communicating between user equipment and TRPs (base stations) in a network.

Operation

The base station 5 is beneficially configured to transmit in its cell (or in each cell if the base station operates multiple cells) a set of beam-specific reference signals (BRS). For example, the base station 5 may transmit one BRS per Beam ID. The mobile devices 3 may use the associated BRS for performing signal strength and channel estimate measurements for each beam. The BRS is transmitted (e.g. periodically) using predefined time/frequency resources using the beam pattern of the corresponding beam. It will be appreciated that different BRS's may be transmitted in the same time/frequency resources or in different time/frequency resources (for example, when 'beam scanning' is employed). Preferably, the various BRS's within the same cell are orthogonal to each other (over the set of time/frequency resources in which they are transmitted), whilst BRS's in different cells have low cross-correlation with each other. The BRS corresponding to a given Beam ID may be determined (by the mobile device 3) based on the Beam ID and the Cell ID. In other words, the mobile device 3 may be able to construct the BRS for a particular beam (including the set of time/frequency resources in which the BRS is transmitted) based on the associated Beam ID and Cell ID.

Idle Mode and Initial Cell Selection

When the mobile device 3 is in idle mode, it may perform an initial cell search using appropriate synchronisation signals transmitted by the base station (via each of the multiple beams configured in the cell/coverage area of the base station).

Figure 4:
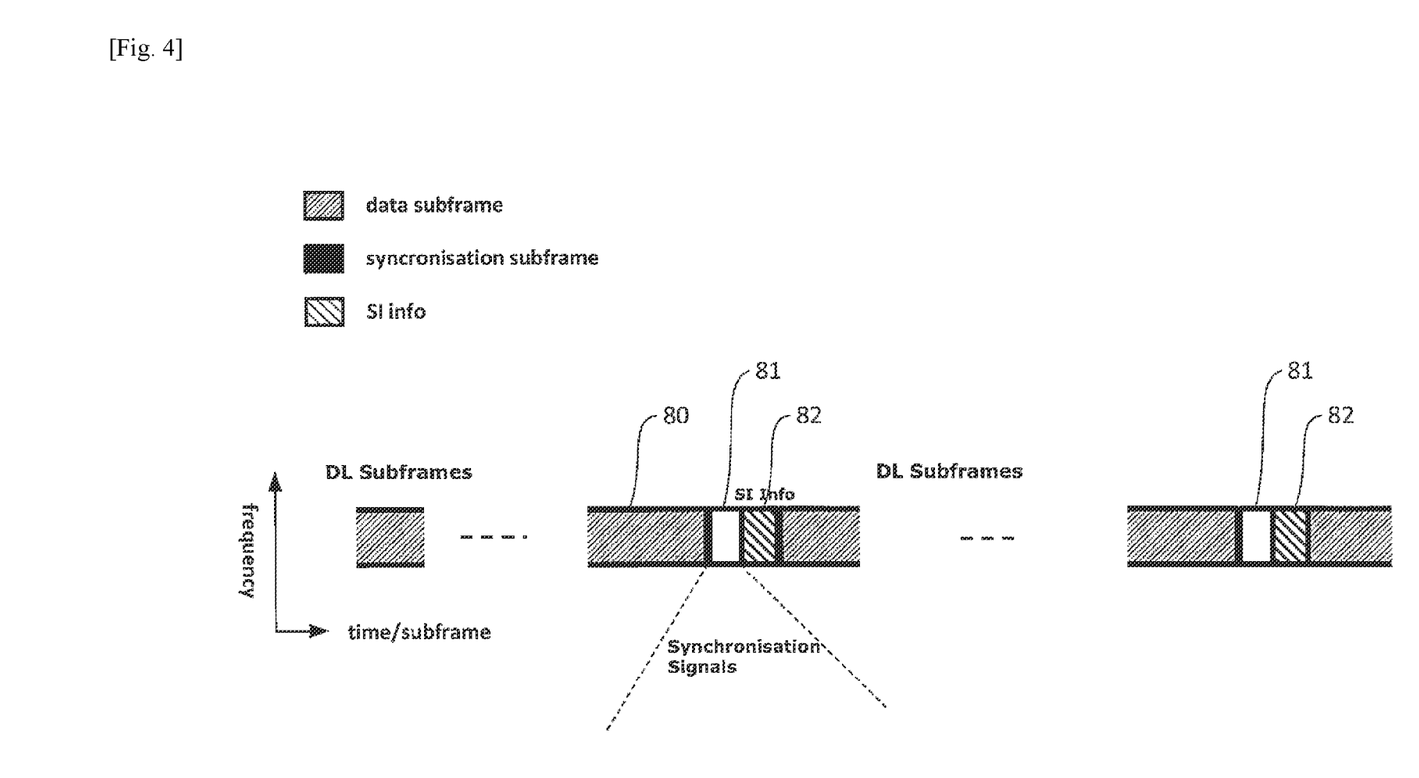
FIG. 4 illustrates schematically a sequence of subframes that may be used for (control and user) data transmission in the system of FIG. 1.
Figure 5:
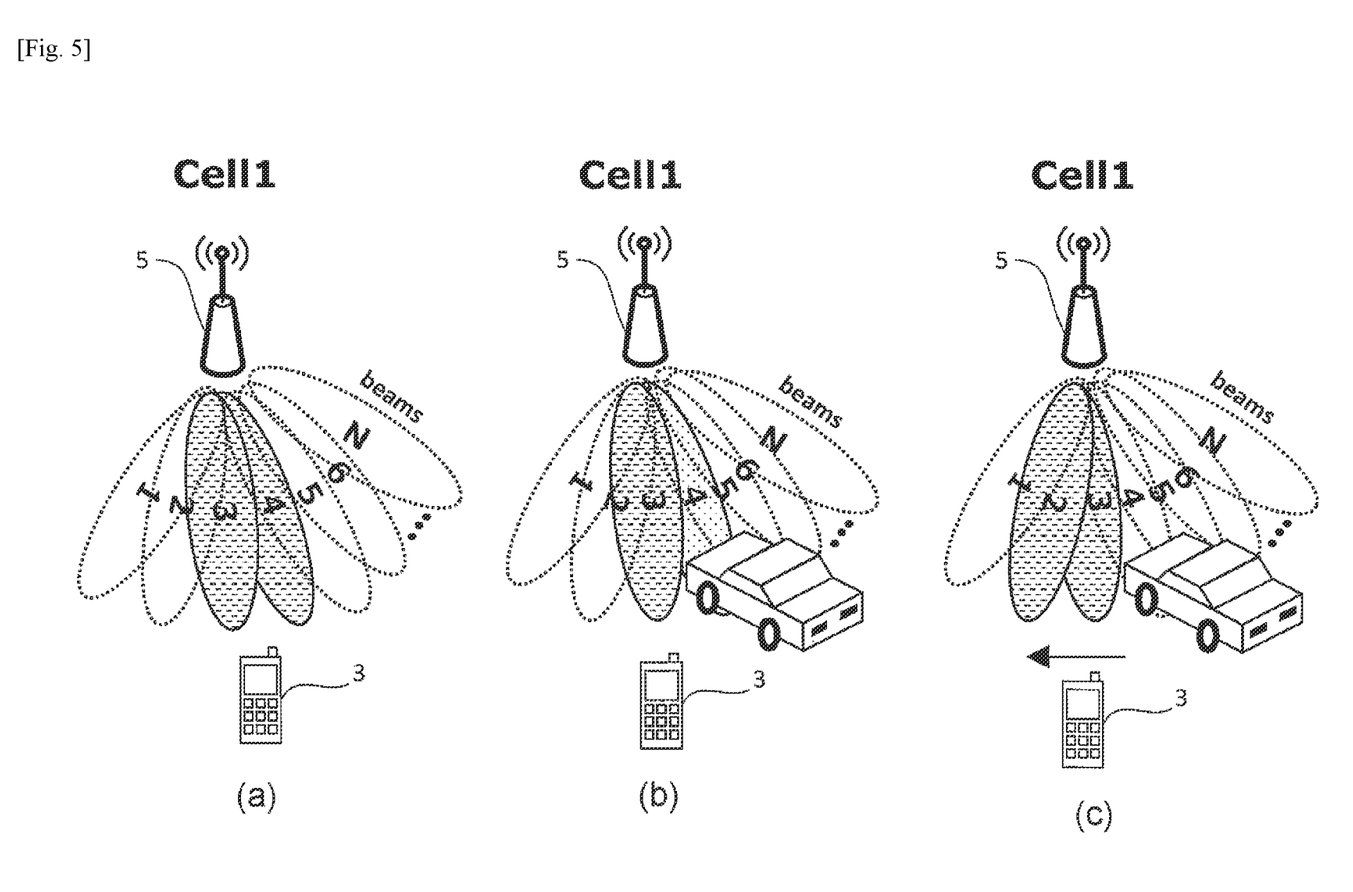
FIG. 5 illustrates schematically an example embodiment in which directional beams may be used.

FIG. 4 illustrates schematically an exemplary sequence of subframes (in this example, downlink subframes) transmitted by the base station in each of its beams. As can be seen, the subframes comprise a number of (downlink) data subframes 80 in the base station 5 may transmit data to the mobile devices 3 in its cell (and served via this particular beam). It will be appreciated that (although not shown in FIG. 4 for simplicity) each data subframe 80 may also carry control signals (e.g. scheduling information) and/or reference signals (for signal measurements).

Beneficially, the base station is configured to transmit (periodically) appropriately formatted synchronisation signals in specific subframes (herein referred to as synchronisation subframes 81). For example, such synchronisation subframes 81 may be transmitted in a subframe preceding the subframe in which system information (SI) broadcast is transmitted (denoted SI info subframe 82 in FIG. 4). Therefore, using the synchronisation signals, the mobile device 3 is able to adapt its transceiver to use the correct time/frequency resources in that particular beam before it proceeds to receiving the system information broadcast. This beneficially allows the mobile device 3 to find and connect to the base station 5 via that beam in a quick and efficient manner.

Specifically, the following options may be used in order to facilitate the mobile device 3 carrying out beam searching for initial access (by performing a random access procedure):

a) Beamformed downlink (DL) synchronisation signals—the mobile device may be configured to detect the cell ID from the synchronisation signals, and possibly detects the associated beam ID from beam reference signal (BRS) transmitted in a particular beam;

b) Beamformed DL system information—the mobile device 3 may be configured to acquire necessary system information from the cell and possibly some beam specific system information for communication via a particular beam;

c) Beamformed UL physical random access channel (PRACH) transmission (msg1)-PRACH resources may be configured using the system information which the mobile device acquires in advance (i.e. prior to initiating a random access procedure by sending a so-called 'msg1' transmission via a particular beam); and d) Beamformed DL random access messages (msg2/4)-PRACH resources for transmitting msg2/4 (via a particular beam) may be configured using the system information.

<Connected Mode Intra-Cell Mobility>

It will be appreciated that while in connected mode (e.g. after performing an appropriate beam searching and random access procedure), the mobile device 3 may connect to its serving cell using one or multiple beams, referred to as the Operational Beam Set (OBS) for that mobile device 3. Such an OBS may comprise a (typically small) sub-set of the beams within the base station's cell, which sub-set is selected for communication with that mobile device 3 while it remains within the cell of the base station 5.

However, in order to account for mobility of the mobile device 3 within the cell (and/or for changes in signal conditions) within the cell, the base station 5 may modify the OBS of the mobile device 3 by adding or removing beams based on at least one of, for example:
  beam measurements (performed and reported by the mobile device 3 and/or derived by the base station 5 from UL transmissions by that mobile device 3);
  beam load (traffic congestion); and
  beam priority (which may be set by, for example, higher layers for inter-cell interference coordination and/or the like).

<OBS Measurements for Intra-Cell Mobility>

In order to account for mobility of the mobile device 3 within the cell, the base station 5 may also use beam measurements (performed and reported by the mobile device 3 and/or derived by the base station 5 from UL transmissions by that mobile device 3).

In this case, the beam measurements reported by the mobile device 3 may comprise, for example, a reference signal received power (RSRP) and/or a signal to interference plus noise ratio (SINR) associated with each beam (measured using the respective BRS on each beam).

The mobile device 3 may be configured (by the serving base station 5 via appropriate measurement configuration signalling) to report the measurements periodically and/or in an event-triggered manner. For example a report may be triggered when the RSRP of a beam goes above or below a predetermined threshold (either absolute or relative to another beam) for a certain amount of time. This is similar to handover measurements in LTE.

Optionally, the mobile device 3 may be configured to sort the beams in order of preference based on the measurements, and report the measurements only for the best beams (e.g. a predetermined number of beams), or report (e.g. as a list) the beam IDs associated with the best beams for that mobile device 3.

However, it will also be appreciated that the mobile device 3 may request for a specific beam or beams to be added or removed from its OBS (even without reporting the actual measurements). This may reduce the amount of signalling required between the mobile device 3 and the base station 5. The base station 5 may optionally specify a sub-set of beams to be measured and reported by the mobile device 3 (e.g. before adding them to, or removing them from, the OBS).

In the case of time division duplex (TDD) transmissions, the base station 5 may also be configured to exploit channel reciprocity for selecting the most appropriate beam(s) for the OBS of a mobile device 3 based on channel measurements derived from UL transmissions from that mobile device 3.

Whenever the network (base station 5) modifies the OBS, it informs the mobile device 3 using appropriately formatted control signalling (e.g. RRC signalling).

<UE-Specific Data and Control>

Beneficially, the OBS may be used for i) UE-specific DL data transmissions (similarly to how a physical downlink shared channel or 'PDSCH' is transmitted in LTE cells) and ii) UE-specific DL control transmissions (similarly to enhanced physical downlink control channel or 'E-PDCCH' in LTE).

OBS may be useful at least for reducing the amount of CSI signalling and for facilitating open-loop transmit diversity for a particular mobile device 3.

Specifically, a reduction in the amount of CSI signalling may be achieved as follows. Typically, DL beamforming for the transmission of UE-specific channels is based on CST reports from the UE (mobile device 3). However, when using OBS, it is possible to reduce the overhead of CST measurement and signalling by configuring the mobile device to send detailed CSI reports only for those beams that are in the OBS (using the associated BRS on those beams for CSI measurement).

In a particularly beneficial case, the base station 5 may apply appropriate pre-coding (amplitude and phase weighting) for its DL transmission across the beams in the OBS, based on the CST reports from the mobile device 3. In this case a UE-specific DM-RS may be included in the transmission so that the mobile device 3 does not need to be aware of the pre-coding weights used by the network.

The base station 5 may be configured to apply transmission diversity over the beams in the OBS. In this case the mobile device 3 can extract the transmitted signal from each beam using the BRS on each beam and then combine the transmitted signals before decoding. This scheme has an advantage that no detailed CST is required from the mobile device 3.

<Common Control Signalling>

The mobile device 3 may need to receive from the network certain control information which is not specific to that UE and/or which does not need to be broadcast over the whole cell of the base station 5. Such control information may include, although not being limited to, for example: random access response (RAR) message 2 and message 4, power control signalling, paging.

The base station 5 may transmit such common control information on all beams in the OBS (for example using open-loop transmit diversity as described previously). In this case, the mobile device 3 may use the BRS on each beam to demodulate the transmission on that beam and then combine the received data in order to improve communication reliability.

<Intra-Cell Mobility>

FIG. 5(a) illustrates schematically a base station 5 operating a number of directional beams, from which beams #3 and #4 are currently allocated to the OBS of the mobile device 3. The beams that are included in the OBS are shown using continuous lines and the beams not included in the OBS are shown in dotted lines.

It will be appreciated that the diversity created by using multiple beams between the base station 5 and the mobile device 3 may significantly reduce the chance of the mobile device 3 losing connection with the base station 5 due a obstacles and/or mobility (whilst in the cell of the base station 5) even when the base station 5 is operating high frequency bands in its cell. That is, in the case of losing one beam for more), the mobile device 3 is still likely to remain connected to at least one beam (or even multiple beams) of the base station 5, and hence it should be able to tolerate a loss in received SNR (combined from multiple beams).

In more detail, FIG. 5(a) illustrates schematically a scenario in which the mobile device 3 is currently communicating with the base station 5 using an OBS comprising beams #3 and #4. Because these are included in the OBS, the mobile device 3 is configured to send (relatively frequent) detailed CSI reports for beams #3 and #4, whilst the mobile device 3 only sends periodic (less frequent) RSRP measurements for the other beams (and/or RSRP measurements for beams #3 and #4).

As generally shown in FIG. 5(b), an obstacle (e.g. a vehicle) between the mobile device 3 and the base station 5 may cause in a drop in the RSRP of a beam in the OBS (in this example beam #4). However, such change in signal condition is beneficially tracked by the CSI measurement for that beam, and the mobile device 3 is still able to receive DL transmissions via beam #3 (which does not currently suffer a degradation of signal quality due to the obstacle). Accordingly, using the CSI measurement for the affected beam (#4), the base station 5 is able to carry out necessary adjustments in its transmission (e.g. prioritise beam #3 over beam #4) for the mobile device 3 (at least temporarily). If the CSI measurement for the affected beam still indicate poor signal conditions (e.g. over a predetermined period and/or number of CSI reports, then the base station 5 may be configured to remove the affected beam from the OBS of the mobile device 3.

Similarly, the base station 5 may be configured to remove a beam from the OBS of the mobile device 3 due to mobility of the mobile device 3. Such a mobility scenario is generally illustrated in FIG. 5(c). Specifically, in this example, as the mobile device 3 moves within the cell of the base station 5, the network (and/or the mobile device 3) monitors (e.g. using the beam RSRP measurements and/or CSI) the signal conditions for the beams included in the OBS (and/or signal conditions for adjacent beams) and decides to update the OBS by removing beam #4 and adding beam #2 when the mobile device 3 is no longer in the area served by beam #4.

<Connected Mode Inter-Cell Mobility>

In order for the network (base station 5) to decide when to initiate handover of the mobile device 3 to a neighbour cell, it may configure the mobile device 3 to perform measurements that take into account the beamforming gain available from the beams used in the neighbour cell. Beneficially, therefore, when selecting a handover target cell for the mobile device 3, the serving base station 5 is able to select the most suitable beams of the handover target cell so that the mobile device 3 can continue communicate via the new cell without experiencing significant data loss and/or delays.

In order to facilitate inter-cell mobility, the mobile device 3 may be configured to measure the respective signal strengths of each beam in one or more neighbouring cells (at least those cells/beams that the current base station requests to be measured). For example, the mobile device 3 may be configured to scan each beam ID (unique BRS) transmitted in the neighbour cell(s), and for each measured neighbour cell, report the ID of the strongest beam (or beams) to the serving base station 5. If the serving base station 5 determines that a handover is required for the mobile device 3, then the serving base station 5 may provide, to the target cell during the handover procedure, information identifying the most suitable beam(s) for the mobile device 3 in the target cell. If available from the mobile device 3, the serving base station 5 may also provide detailed measurements for such beams.

Figure 6:
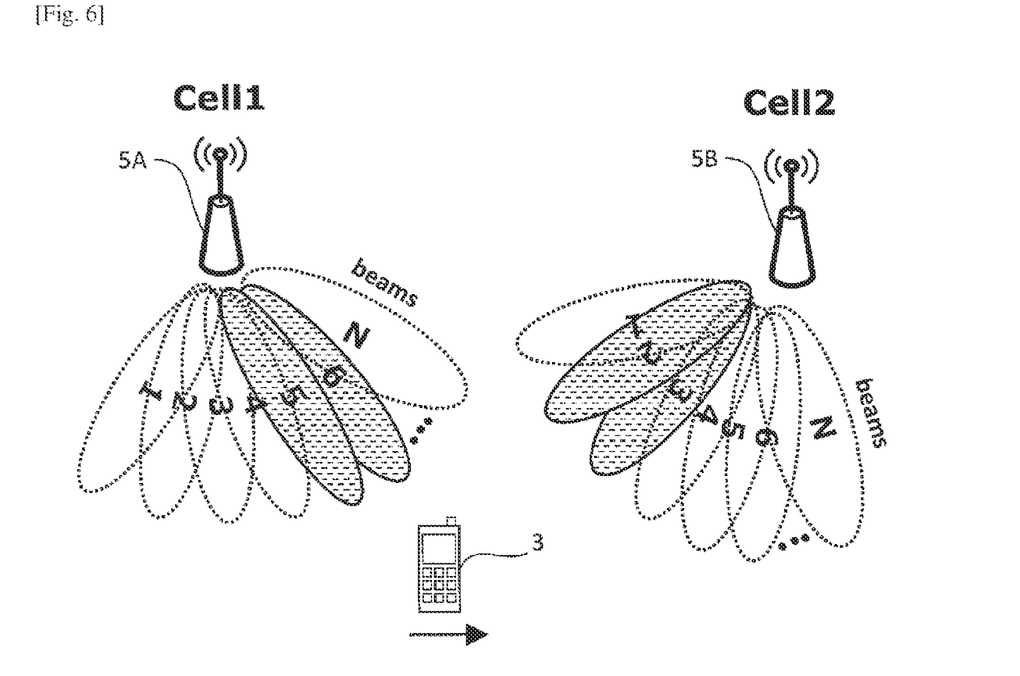
FIG. 6 illustrates schematically another example embodiment in which directional beams may be used.

FIG. 6 illustrates schematically a scenario in which the mobile device 3 performs a handover between a cell ('Cell1') operated by its current serving base station 5A and a neighbour cell ('Cell2') operated by base station 5B.

As can be seen, both base stations 5A and 5B operate a number of directional beams. Initially, the mobile device 3 is communicating with its serving base station 5A using an OBS comprising beams #5 and #6 of Cell1. The mobile device 3 performs appropriate handover measurements on one or more neighbour cells (including Cell2) by measuring RSRP for all beams in that cell. In this example, the mobile device 3 reports strong RSRP for beams #2 and #3 in Cell2. Therefore, when selecting Cell2 as a handover target cell, the current serving base station 5A is beneficially able to control handover of the mobile device 3 to beams 2# and #3 of Cell2 as the most suitable beams in that cell.

Thus, when the mobile device 3 performs a handover to the Cell2, it is potentially able to connect via the most suitable beams in that cell (assuming that those beams are available for the mobile device 3). Even if not all beams in Cell2 having good signal conditions are available for the mobile device 3 (e.g. due to load in the Cell2 and/or the like), the new base station 5B is still able to start serving the mobile device 3 via at least some of the suitable candidate beams (and potentially add other beams to the OBS as the mobile device 3 moves around in the area covered by Cell2).

<OBS in CoMP>

Figure 7:
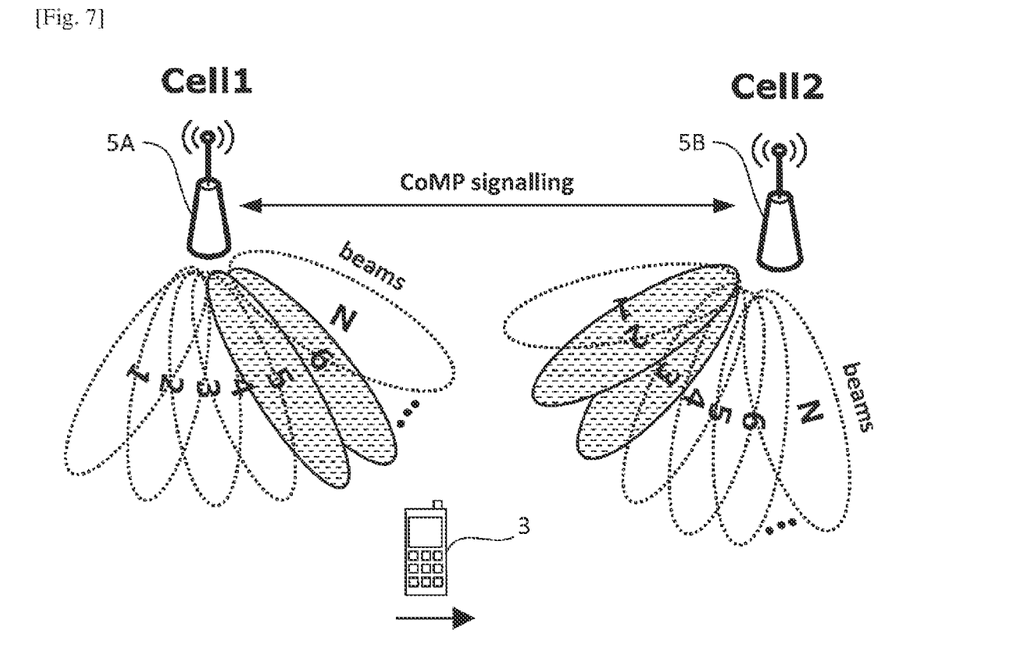
FIG. 7 illustrates schematically a still another example embodiment in which directional beams may be used.

FIG. 7 illustrates schematically a scenario in which the mobile device 3 communicates concurrently via Cell1 operated by base station 5A and Cell2 operated by base station 5B. This scenario is effectively a variant of a Coordinated Multipoint (CoMP) transmission and reception scenario specified for LTE. However, in this case the base stations 5 are configured to allocate specific beams for the mobile device 3 rather than entire component carriers. Such concurrent transmission/reception may be feasible, for example, when the mobile device 3 is located in a cell-edge region and/or when the cells of neighbouring base stations overlap. In such situations, therefore, the mobile device 3 may be able to receive signals from multiple cells (and transmit signals via multiple cells) thereby significantly improving downlink (or uplink) performance. The concurrent transmission/reception (CoMP) may be used for two main purposes: i) to improve signal quality (by transmitting/receiving the same signal via two or more cells); and ii) to improve throughput (by transmitting different data via different cells thus achieving a higher overall data rate than what would be possible using a single cell only).

In the scenario shown in FIG. 7, the mobile device 3 has a respective OBS for each cell in its CoMP measurement set (in this example, Cell1 and Cell2), and it is configured to measure and report per-beam CSI for each beam in each OS. Specifically, in this example, the OBS for the mobile device 3 in Cell1 includes beams #5 and #6 of that cell, and the OBS for the same mobile device 3 in Cell2 includes beams #2 and #3 of Cell2. Therefore, the mobile device 3 is configured to perform per-beam CSI measurements and reporting for beams #5 and #6 of Cell1 and beams #2 and #3 of Cell2.

It will be appreciated that the per-beam CSI measurement may be reported to the same (e.g. a master) base station 5 regardless of which base station operates that beam and/or the CSI measurement may be reported to the base station that operates that particular beam. Regardless which base station 5 the mobile device 3 reports to, the base stations 5 may be configured to exchange CoMP related signalling with each other via an appropriate base station to base station interface provided between them. The CoMP related signalling may include, for example, per-beam CSI and similar information associated with the OBS of the mobile device 3 (e.g. beam IDs included in the OBS).

Moreover, when concurrent transmission/reception is used, decisions to add/remove cells to/from the mobile device's 3 CoMP measurement set may be based on associated per-beam RSRP measurements (which may be obtained as described above). Beneficially, therefore, it is possible to improve signal conditions for mobile devices (whilst using narrow, high frequency directional beams) and/or improve throughput (by communicating via multiple cells) using beam specific reference signals and respective OBS configurations in each cell, together with appropriate coordination between the serving base stations.

Modifications and Alternatives

Detailed example embodiments have been described above. As those skilled in the art will appreciate, a number of modifications and alternatives can be made to the above example embodiments whilst still benefiting from the inventions embodied therein. By way of illustration only a number of these alternatives and modifications will now be described.

It will be appreciated that the beam configuration may be different for different cells, depending on the coverage/throughput requirements for a particular cell. For example, a high number of very narrow beams may be used for a large cell radius, whilst fewer and relatively wider beams may be used to facilitate fast cell acquisition and reduce the overhead for transmission of beam-specific reference signals. In some cases, the beam configuration may consist of a single beam, defining the coverage of the whole cell (similarly to legacy cells).

It will also be appreciated that the beam configuration of a given cell may change semi-statically, e.g. for the purposes of self-organising network (SON) adaptation such as Capacity and Coverage Optimisation (CCOpt) and/or the like. In this case, reconfiguration of a particular beam configuration may include changing the beam-width of one or more beams and/or changing the number of beams (e.g. switching beams on or off).

When preparing for handover between cells, if such information is available, the serving base station may inform the mobile device of the number of beams currently operated in the neighbour cell, so that the mobile device knows the range of beam IDs it needs to scan/measure. However, if such information is not available or not sent to the mobile device, the mobile device may be configured to perform beam measurement assuming that the neighbour cell has the maximum possible number of beams. In any case, using the information identifying the most suitable beams of the target cell, there is no need to perform extensive beam measurements upon entering the target cell because the mobile device already has a potential set of beams that can be considered for its OBS in the target cell.

In the above example embodiments the base station is described to transmit a plurality of directional beams. It will be appreciated that data may be transmitted substantially concurrently via the plurality of beams. However, in some cases, for example when a hybrid (part analogue and part digital) beamforming is used, it may not be possible to transmit all beams at once. It will be appreciated that in this case a technique referred to as 'beam sweeping' (i.e. transmitting one beam at a time) may be used.

It will be appreciated that, instead of the network (base station) deciding on the OBS based on measurements from the mobile device, the mobile device may be configured to choose the beams for its own OBS and (unless configured differently) report the Channel Status Information (CSI) only for the beams chosen by the mobile device 3 for its OBS. In this case, beneficially, the network is able to determine the OBS implicitly from the beams (Beam IDs) included in the CSI reports. Since CSI reports for beams in the OBS are likely to be needed anyway, this method has the advantage that no additional signalling is required when the mobile device is updating its OBS.

In the above example embodiments, the base station uses a 3GPP radio communications (radio access) technology to communicate with the mobile device. However, any other radio communications technology (i.e. WLAN, Wi-Fi, WiMAX. Bluetooth, etc.) can be used between the base station and the mobile device in accordance with the above embodiments. The above example embodiments are also applicable to 'non-mobile' or generally stationary user equipment.

In the above description, the mobile device and the base station are described for ease of understanding as having a number of discrete functional components or modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

In the above example embodiments, a number of software modules were described. As those skilled in the art will appreciate, the software modules may be provided in compiled or un-compiled form and may be supplied to the base station, to the mobility management entity, or to the mobile device as a signal over a computer network, or on a recording medium. Further, the functionality performed by part or all of this software may be performed using one or more dedicated hardware circuits. However, the use of software modules is preferred as it facilitates the updating of the base station or the mobile device in order to update their functionalities.

Each controller may comprise any suitable form of processing circuitry including (but not limited to), for example: one or more hardware implemented computer processors: microprocessors; central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like.

The controller of the base station may be operable to control, for each communication device, a respective operational beam set (OBS) comprising at least one directional beam associated with that communication device.

The transceiver of the base station may be operable to receive from at least one communication device results of measurements performed on respective reference signals transmitted, via each beam, and the controller may be operable to determine each beam in said OBS based on the results of measurements performed on the reference signals.

The transceiver of the base station may be operable to receive from at least one communication device results of OBS specific measurements (e.g. channel state indicator. CSI, measurements) for beams that are included in the OBS for that at least one communication device.

The controller of the base station may be operable to control a handover for a particular communication device based on at least one of: the OBS associated with that communication device and beam specific reference signals.

The controller of the base station may be operable to control a coordinated multipoint (CoMP) transmission/reception for a particular communication device based on at least one of: the OBS associated with that communication device and beam specific reference signals.

The transceiver of the base station may be operable to transmit, via each beam, respective control information comprising reference signals. In this case, the respective reference signals transmitted via each beam may be beam specific reference signals. The transceiver of the base station may be configured to transmit the respective reference signals in each beam periodically, using predefined resources (e.g. time/frequency resources). The predefined resources may be specific to a particular beam. Alternatively, the predefined resources may be common to a plurality (e.g. a subset or all) beams.

The respective reference signals transmitted via each beam may depend on the corresponding beam identifier and a cell identifier associated with the communication area and/or the resources used for transmitting the respective reference signals via each beam may depend on the corresponding beam identifier and a cell identifier associated with the communication area.

The controller of the base station may be operable to control a beam configuration associated with the communication area of the base station, and the transceiver of the base station may be operable to transmit (e.g. broadcast), within the communication area, the beam configuration associated with that communication area. The beam configuration may define at least one of: a number of beams in the communication area, a beam pattern in the communication area, a respective width associated with each beam, whether a particular beam is turned on or off, resources used for transmitting a reference signal (or a set of reference signals) in a particular beam, resources allocated for random access procedure per beam.

The transceiver of the base station may be operable to communicate respective beam specific system information using each directional beam. The transceiver of the base station may be operable to communicate, over each beam, information identifying resources for random access procedure signalling over that beam. The transceiver of the base station may be operable to receive, from the at least one communication device over at least one beam, random access procedure signalling using the identified resources.

The transceiver of the base station may be operable to apply transmission diversity, for the at least one communication device, using a plurality of directional beams associated with the at least one communication device, in this case, the processor of the communication device may be operable to combine respective data received using each of a plurality of directional beams before decoding the data.

The transceiver of the base station may be operable to transmit, using the plurality of directional beams associated with the at least one communication device, signalling which is not specific to the at least one communication device (e.g. RAR message 2 and message 4, power control, and/or paging).

The base station may comprise a massive antenna for forming a plurality of directional beams. The base station may be a base station of a next generation (NextGen or 5G) radio access network.

The controller of the communication device may be operable to perform measurements on respective reference signals transmitted, via each beam, and the transceiver of the communication device may be operable to send the results of the measurements to the base station. The controller of the communication device may be operable to perform measurements (e.g. channel state indicator, CSI, measurements) for beams that are included in the OBS for the communication device, and the transceiver of the communication device may be operable to send the results of the measurements to the base station.

The controller of the communication device may be operable to control a coordinated multipoint, CoMP, transmission/reception via the base station based on at least one of: the OBS associated with the communication device in that communication area and beam specific reference signals.

Various other modifications will be apparent to those skilled in the art and will not be described in further detail here.

This application is based upon and claims the benefit of priority from United Kingdom patent application No. 1613902.4, filed on Aug. 12, 2016, the disclosure of which is incorporated herein in its entirety by reference.

What is claimed:

1. A base station comprising:
a transceiver; and
a controller configured to:
perform an initial access procedure with a mobile terminal,
transmit a synchronization signal and a beam specific reference signal via a beam during the initial access procedure, the beam specific reference signal being based on a cell identity of the base station which is derived from the synchronization signal via the beam and an identity corresponding to the beam; and
transmit system information specific to the beam in a resource determined by information transmitted via the beam.

2. The base station according to claim 1 wherein the controller is configured to transmit control information using a time or frequency resource determined by the system information or the beam.

3. A method performed by a base station, the method comprising:
performing an initial access procedure with a mobile terminal;
transmitting a synchronization signal and a beam specific reference signal via a beam during the initial access procedure, the beam specific reference signal being based on a cell identity of the base station which is derived from the synchronization signal via the beam and an identity corresponding to the beam; and
transmitting system information specific to the beam in a resource determined by information transmitted via the beam.

4. A mobile terminal comprising:
a transceiver; and
a controller configured to:
perform an initial access procedure with a base station;
receive a synchronization signal and a beam specific reference signal via a beam during the initial access procedure, the beam-specific reference signal being based on a cell identity of the base station which is derived from the synchronization signal via the beam and an identity corresponding to the beam; and
detect system information specific to the beam in a resource determined by information transmitted via the beam.

5. A method performed by a mobile terminal, the method comprising:
performing an initial access procedure with a base station;
receiving a synchronization signal and beam-specific reference signal via a beam during the initial access procedure, the beam-specific reference signal being based on a cell of the base station which is derived from the synchronization signal via the beam and an identity corresponding to the beam; and detecting system information specific to the beam in a resource determined by information transmitted via the beam.

6. The method according to claim 3, further comprising:
transmitting control information using a time or frequency resource determined by the system information or the beam.

7. The mobile terminal according to claim 4, wherein the controller is configured to determine a time or frequency resource for receiving control information, based on the system information or the beam.

8. The method according to claim 5, further comprising:
determining a time or frequency resource for receiving control information, based on the system information or the beam.

* * * * *